(12) United States Patent
Rupp

(10) Patent No.: US 10,937,612 B2
(45) Date of Patent: Mar. 2, 2021

(54) DC VOLTAGE SWITCH

(71) Applicant: Siemens Aktiengesellschaft, Munich (DE)

(72) Inventor: Jürgen Rupp, Erlangen (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 240 days.

(21) Appl. No.: 16/080,201

(22) PCT Filed: Feb. 6, 2017

(86) PCT No.: PCT/EP2017/052495
§ 371 (c)(1),
(2) Date: Aug. 27, 2018

(87) PCT Pub. No.: WO2017/148651
PCT Pub. Date: Sep. 8, 2017

(65) Prior Publication Data
US 2019/0057825 A1  Feb. 21, 2019

(30) Foreign Application Priority Data

Feb. 29, 2016  (DE) .......... 10 2016 203 256

(51) Int. Cl.
*H01H 33/59* (2006.01)
*H01H 9/54* (2006.01)
(Continued)

(52) U.S. Cl.
CPC ........ *H01H 33/596* (2013.01); *H01H 3/0213* (2013.01); *H01H 9/542* (2013.01);
(Continued)

(58) Field of Classification Search
USPC .................................... 361/2–13
See application file for complete search history.

(56) References Cited

U.S. PATENT DOCUMENTS

| | | | |
|---|---|---|---|
| 4,307,428 A | 12/1981 | Yanabu et al. | 361/4 |
| 4,805,062 A | 2/1989 | Shirouzu et al. | 361/4 |

(Continued)

FOREIGN PATENT DOCUMENTS

| | | | | |
|---|---|---|---|---|
| CN | 103138572 A | 6/2013 | | H02M 3/10 |
| DE | 742715 C | 12/1943 | | H01H 33/59 |

(Continued)

OTHER PUBLICATIONS

Chinese Office Action, Application No. 201780013620.0, 13 pages, dated Mar. 12, 2019

(Continued)

*Primary Examiner* — Danny Nguyen
(74) *Attorney, Agent, or Firm* — Slayden Grubert Beard PLLC

(57) ABSTRACT

Various embodiments may include a voltage switch having two terminals linked by an operating current path comprising a mechanical switch, and having means of generating a counter voltage to the voltage in the operating path. In some embodiments, there are: two terminals linked by an operating current path comprising a mechanical switch; a transformer having a primary side connected in series with the mechanical switch in the operating current path; a voltage source connected to a secondary side of the transformer; and a switch connected in series with the voltage source.

19 Claims, 2 Drawing Sheets

(51) Int. Cl.
*H01H 9/56* (2006.01)
*H01H 3/02* (2006.01)
*H02H 3/087* (2006.01)
*H01H 33/14* (2006.01)

(52) U.S. Cl.
CPC .............. *H01H 9/56* (2013.01); *H02H 3/087* (2013.01); *H01H 2009/543* (2013.01); *H01H 2033/146* (2013.01)

(56) References Cited

U.S. PATENT DOCUMENTS

| | | | |
|---|---|---|---|
| 2012/0218676 A1* | 8/2012 | Demetriades | H01H 9/542 361/115 |
| 2012/0299393 A1* | 11/2012 | Hafner | H01H 9/542 307/113 |
| 2013/0134958 A1 | 5/2013 | Mochikawa et al. | 323/311 |
| 2014/0299579 A1 | 10/2014 | Hartmann et al. | 218/145 |
| 2015/0207310 A1 | 7/2015 | Bakra | 361/100 |
| 2016/0156175 A1* | 6/2016 | Koshizuka | H02H 9/02 361/93.9 |
| 2017/0011875 A1 | 1/2017 | Dorn et al. | 218/12 |
| 2019/0190251 A1* | 6/2019 | Corzine | H03K 17/687 |

FOREIGN PATENT DOCUMENTS

| | | | |
|---|---|---|---|
| DE | 2936279 A1 | 3/1980 | ............. H01H 33/59 |
| DE | 3734989 A1 | 4/1988 | ............. H01H 33/59 |
| DE | 102011083514 A1 | 3/2013 | ............. H01H 33/16 |
| WO | 2017/148651 A1 | 9/1917 | ............. H01H 33/59 |
| WO | 2013/189524 A1 | 12/2013 | ............. H01H 33/59 |
| WO | 2015/110142 A1 | 7/2015 | ............. H01H 33/59 |

OTHER PUBLICATIONS

German Office Action, Application No. 102016203256.9, 7 pages, dated Nov. 22, 2016.
International Search Report and Written Opinion, Application No. PCT/EP2017/052495, 20 pages, dated Apr. 12, 2017.

* cited by examiner

DC VOLTAGE SWITCH

CROSS-REFERENCE TO RELATED APPLICATIONS

This application is a U.S. National Stage Application of International Application No. PCT/EP2017/052495 filed Feb. 6, 2017, which designates the United States of America, and claims priority to DE Application No. 10 2016 203 256.9 filed Feb. 29, 2016, the contents of which are hereby incorporated by reference in their entirety.

TECHNICAL FIELD

The disclosure relates to a DC circuits. Various embodiments may include a voltage switch having two terminals linked by an operating current path comprising a mechanical switch and means of generating a counter voltage to the voltage in the operating path.

BACKGROUND

Because there is no zero crossing, it is more difficult to disconnect a direct current (DC current) than to disconnect an alternating current (AC current). With a suitable design, the arc struck when the contacts are opened is extinguished at the next zero crossing of the current in the case of the AC current, but with the DC current the arc continues to burn even across comparatively large gaps until the switch is destroyed.

Different concepts are employed for bringing about reliable interruption of a DC current. Some examples incorporate a counter current which compensates the load current so that the current goes through a zero crossing in a mechanical switch. The switch can then be opened at zero current so that no arc is produced or extinguished. In some examples, the current first commutates into a semiconductor switch by which it can be interrupted without arcing.

SUMMARY

The teachings of the present disclosure may include a DC voltage switch having an improved switching speed. For example, some embodiments may include a DC voltage switch (12) having two terminals (121, 122) which are linked by an operating current path comprising a mechanical switch (13), and having means of generating a counter voltage to the voltage in the operating path, wherein said means comprise: a transformer (14), the primary side of which is connected in series with the mechanical switch (13) in the operating current path; a voltage source (161) connected to the secondary side of the transformer (14); and a switch (162) connected in series with the voltage source (161).

In some embodiments, the voltage source (161) comprises a capacitor (161).

In some embodiments, the capacitor (161) is connected to a device for charging the capacitor (161).

In some embodiments, the mechanical switch (13) is a switch having a switching time of less than 5 ms.

In some embodiments, a switch (163) for short-circuiting the secondary winding of the transformer (14).

In some embodiments, the voltage source (161) is a DC-link capacitor of a converter.

In some embodiments, the voltage source (161) can be connected to the secondary winding of the transformer in both polarities.

In some embodiments, a bridge circuit (164) is connected between the secondary side of the transformer (14) and the voltage source (161).

As another example, some embodiments may include a HVDC network comprising a DC voltage switch (12) as described above.

As another example, some embodiments may include a vehicle, in particular a rail vehicle having a DC voltage switch (12) as described above.

BRIEF DESCRIPTION OF THE DRAWINGS

An exemplary embodiment of the teachings herein is explained in greater detail with reference to the accompanying drawings in which the features are schematically represented.

DETAILED DESCRIPTION

Figure 1:
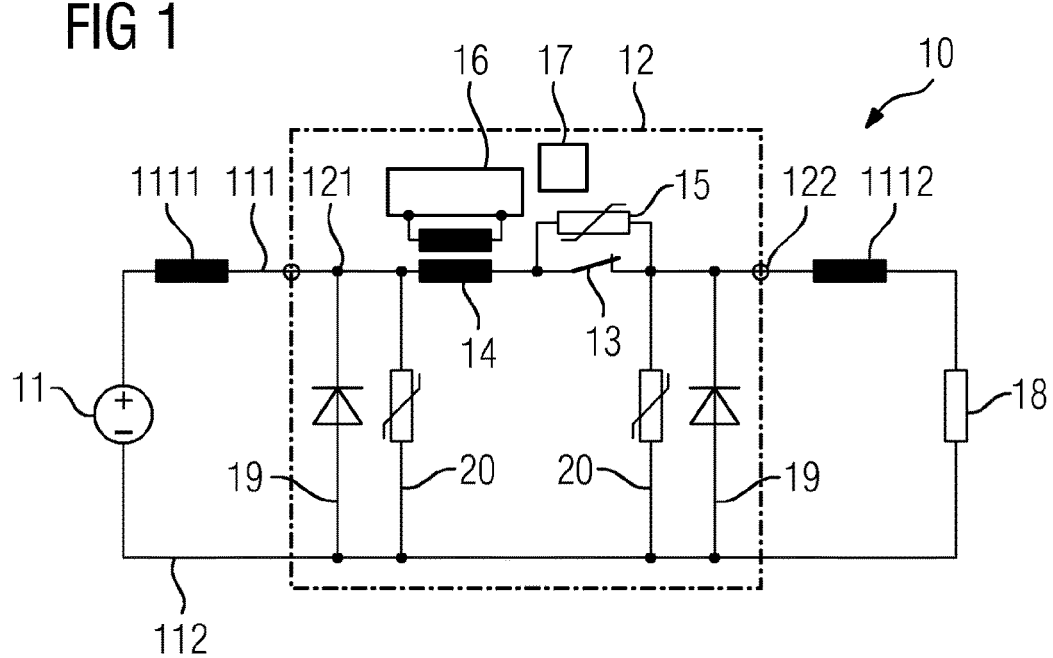
FIG. 1 shows a DC voltage switch having a pulse voltage module according to the teachings herein in a detail of a DC voltage network.

In some embodiments, a DC voltage switch has two terminals linked by an operating current path comprising a mechanical switch. It also comprises means for generating a counter voltage to the voltage in the operating path. These means comprise a transformer, the primary side of which is connected in series with the mechanical switch in the operating current path; a voltage source connected to the secondary side of the transformer; a switch connected in series with the voltage source.

In some embodiments, the load current is limited by the immediately acting counter voltage even in the event of a short circuit, whereas, in the case of particular known concepts, it continues to increase until the arc is extinguished. In addition, due to the electrical isolation of the transformer, the potential can be freely selected on the secondary side, and also the driving voltage depending on the transformation ratio. Another advantage is that there is no semiconductor switch in the operating current path, thereby keeping the electrical losses to a minimum.

In some embodiments, the following features may be included in a DC voltage switch:

The voltage source can comprise an energy storage device, in particular a capacitor. A capacitor is suitable above all for rapid release of the energy necessary to compensate a short-circuit current or even a normal operating current in the DC voltage network and thus force a zero current crossing.

The voltage source can be provided as a separate device, e.g. as a separate capacitor, which is connected to the transformer independently of other components of the DC voltage network. This makes it possible to ensure that the voltage source is available irrespective of other circumstances, e.g. by means of a separate charging circuit for the voltage source.

The voltage source can be arranged as part of another circuit, e.g. as a DC-link capacitor of a converter, which is e.g. otherwise linked to the DC voltage network. This means that available resources of the design are re-used, thereby achieving a component saving overall.

The mechanical switch may have a switching time of less than 5 ms. As the zero current crossing is based on the discharging of an energy storage device, the period of time within which a zero current crossing occurs is typically limited to just a few milliseconds. Within this brief period, the mechanical switch opens in order to bring about reliable suppression or extinguishing of the arc.

The device can be designed such that the secondary winding of the transformer can be short-circuited. For this purpose, for example, a connection between the winding ends of the secondary winding of the transformer can be provided, said connection being provided with a semiconductor switch or a high-speed mechanical switch. Short-circuiting of the secondary winding of the transformer causes the inductance of the primary winding of the transformer to be reduced to a very low value, thereby advantageously diminishing the effect of the primary winding of the transformer on the characteristics of the DC voltage network.

The voltage source can be connected to the secondary winding of the transformer in both polarities. For example, the voltage source can be connected to the secondary winding of the transformer via a bridge circuit of semiconductor switches for this purpose. The bridge allows the voltage source to be connected in both directions. The advantage of this is that a counter voltage of any polarity can be produced in the operating current path, thus enabling a DC voltage of any flow direction to be interrupted, i.e. bi-directionally.

The device can have means of dissipating the energy inductively stored in the DC voltage network. For this purpose, for example, a varistor can be connected in parallel with the mechanical switch. Alternatively or in addition, a connection between the poles of the DC voltage network can be established via a diode and a varistor on one or both sides of the mechanical switch in order to create freewheeling paths for the inductively stored energy.

The device can incorporate means of absorbing energy from the operating current path. For example, inductively stored energy from the DC voltage network can therefore be absorbed during interruption. This energy can, for example, be temporarily stored in the voltage source and released again later.

FIG. 1 shows a DC voltage switch 12 having a pulse voltage module according to the teachings herein in a detail of a DC voltage network 10. The DC voltage network 10 is fed from a DC voltage source 11 and thus supplied with DC voltage. The DC voltage network can be a network in the HVDC system or, for example, a network in a vehicle, e.g. a railroad locomotive or power car, or in the field of power feed-in to a network for electrically powered vehicles. The principle is basically applicable at all voltage levels from low voltage to medium voltage to high voltage. A DC voltage switch is disposed between the load 18, which is symbolized by a resistor in a greatly simplified manner, and the DC voltage source 11. Said DC voltage switch 12 is serially linked into a first pole 111 of the DC voltage network 10 by two terminals 121, 122.

Between the terminals 121, 122, the DC voltage switch 12 has a series circuit comprising a high-speed mechanical switch 13 and the primary winding of a transformer 14. In parallel with the mechanical switch 13 is a varistor 15 for reducing overvoltages. The mechanical switch 13 is designed such that opening of the electrical contact is achieved within a few milliseconds, e.g. within 3 ms.

Said varistor 15 is optional and is employed if the inductively stored energy to be dissipated during the switching operation may attain such high values that interruption results in destructively high voltages across the mechanical switch 13. In alternative embodiments for DC voltage networks 10 in which no such high energies are likely, the varistor 15 may be omitted.

In some embodiments, addition elements for reducing overvoltages and thus preventing damage in the DC voltage switch 12 or to other devices in the DC voltage network 10, the DC voltage switch 12 comprises, on the side facing the DC voltage source 11, a first freewheeling path 19 with diodes which are arranged as a connection between the first terminal 121 or second terminal 122 and the second pole 112 of the DC voltage network 10. In addition, two freewheeling paths 20 are provided as the connection between the first terminal 121 or second terminal 122 and the second pole 112 of the DC voltage network 10. The freewheeling paths are again optional and are installed if the energy stored in supply inductances 1111, 1112, e.g. cables, may possibly result in destruction in the event of rapidly interrupted current.

Figure 2:
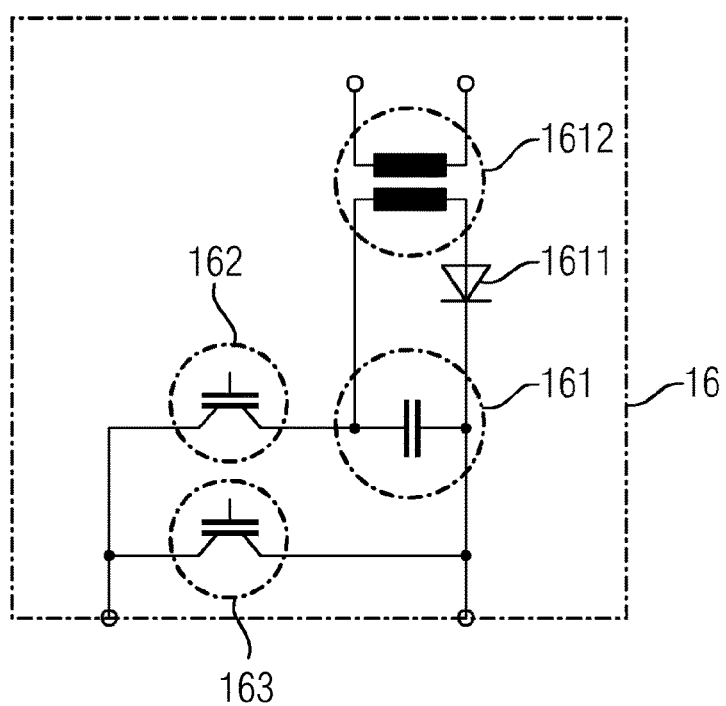
FIGS. 2 to 4 show additional embodiments for the pulse voltage module.
Figure 3:
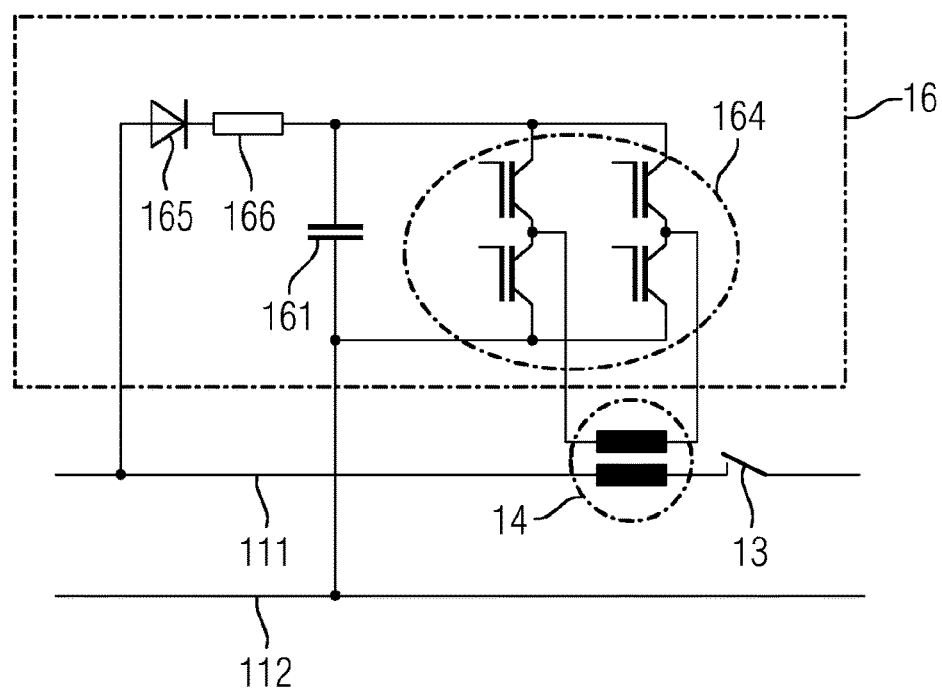
Figure 4:
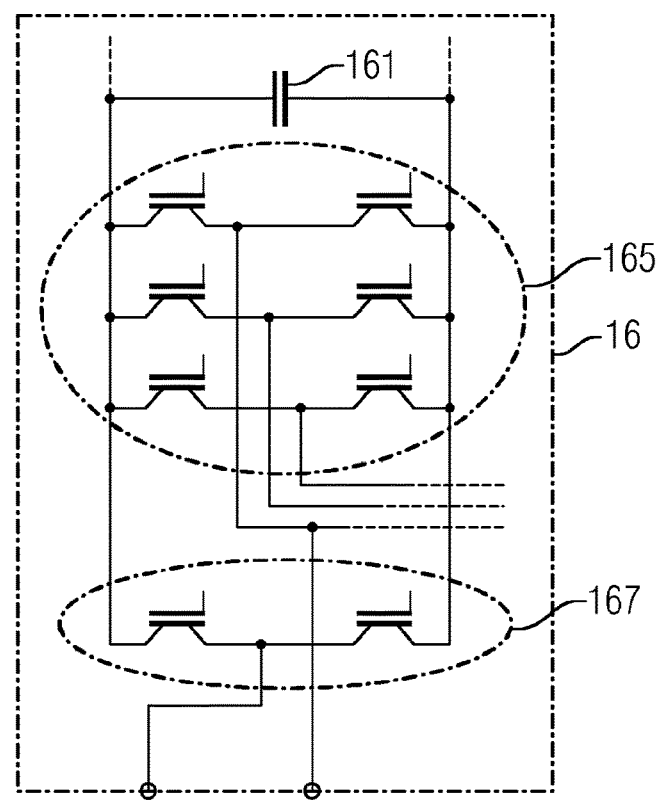

In some embodiments, the secondary winding of the transformer 14 is connected to a pulse voltage module 16 for which various embodiments are shown in FIGS. 2 to 4. The pulse voltage module 16 as well as the mechanical switch 13 and possibly other elements of the DC voltage switch 12 and possibly also other elements of the DC voltage network 10 or other surrounding circuit are controlled by a control device 17.

The required voltage for the capacitor 161 and therefore the precise design of the components in the pulse voltage module can be determined by the choice of transformation ratio in the transformer 14. For example, said components can be optimized for rapid interruption or for compactness. Values between 1 and 10 are expediently used for the turns ratio between the primary side and the secondary side of the transformer 14.

A first option for the design of the pulse voltage module 16 is shown in FIG. 2. The pulse voltage module 16 according to FIG. 2 comprises a capacitor 161 which is used as an energy storage device for generating a voltage pulse. The capacitor is connected via a rectifying diode 1611 to the secondary side of a charging transformer 1612 which is in turn connected on its primary side to a voltage source (not shown). The capacitor is charged via the charging transformer 1612. The necessary capacitance of the capacitor and the magnitude of the necessary charging voltage result from the voltage of the DC voltage network 10 and the transformation ratio of the transformer 14. In this example of a voltage in the DC voltage network 10 of 700 VDC, the coupling factor of the transformer is 95%, the transformation ratio 4 and the magnetizing inductance 500 µH.

In some embodiments, the capacitor 161 is connected in series with a switch 162, e.g. in the form of an IGBT or other semiconductor switch. During normal operation, the switch 162 is OFF and therefore the connection between capacitor 161 and the secondary winding of the transformer 14 is broken on one side, so that the capacitor 161 cannot discharge. The capacitor is constantly charged during normal operation.

Disposed in parallel with the series circuit comprising the capacitor 161 and the switch 162 is a short-circuiting switch 163. In some embodiments, the short-circuiting switch 163 is likewise an IGBT. In low-voltage applications, a MOSFET can also be used. A depletion mode switch can be used here. The bidirectional short-circuiting switch 163 is normally ON and short-circuits the secondary winding of the transformer 14. As a result, the primary side of the transformer 14 only shows a low inductance and the effect on the DC voltage network 10 is therefore minimal.

If a short circuit occurs in the DC voltage network 10 or interruption of the DC current is required for another reason, the short-circuiting switch 163 is turned off and the switch 162 is turned on. In addition, the control device 17 opens the mechanical switch 13, wherein the opening process requires a certain switching time in contrast to the very fast semiconductor switches 162, 163. The capacitor 161 then discharges within a few ms via the now directly connected secondary winding of the transformer 14. As a result, there is induced in the operating current path between the terminals 121, 122 a voltage whose direction is predefined by the charge of the capacitor 161. This is counter to the direction of the voltage in the DC voltage network 10. The total current flow is overcompensated by this voltage and the associated current flow and therefore goes through a zero crossing. The thereby caused negative current flow relative to the flow direction during normal operation through the mechanical switch 13 is limited to a duration of a few ms and therefore another zero crossing of the current occurs shortly thereafter. Within this time, the mechanical switch 13 opens and any arc produced is extinguished by the zero crossing of the current.

The switching capability of the DC voltage switch 12 can subsequently be restored by turning off the switch 162 and then re-charging the capacitor 161.

Another possible implementation of the pulse voltage module 16 is shown in FIG. 3. Although the pulse voltage module 16 again comprises the capacitor 161, the latter is here connected differently from the embodiment in FIG. 2. In the pulse voltage module 16 according to FIG. 3, the capacitor 161 is connected to the secondary winding of the transformer 14 via a bridge 164 of IGBTs. Said bridge 164 has, in the normal manner, two series circuits each comprising two IGBTs which are connected in parallel with one another and in parallel with the capacitor 161. The secondary winding of the transformer 14 is connected between the two potential points located between the two IGBTs of each of the series circuits.

For charging, the capacitor 161 in FIG. 3 is connected to the first pole 111 of the DC voltage network by a terminal lead via a high-ohm charging resistor 166 and a diode. The other terminal lead is connected to the second pole 112 of the DC voltage network. During normal operation, this ensures continuous charging and therefore continuous discharge-readiness of the capacitor 161. In the event of a short-circuit in the DC voltage network 10 or if interruption of the DC current is required for another reason, the capacitor 161 is now connected to the secondary winding of the transformer 14. For this purpose, a pair consisting of an IGBT of one series circuit and an IGBT of the other series circuit of the bridge 164 is connected. By the selection of the pair, the capacitor can be connected to the secondary winding of the transformer 14 in either of the two polarities. The direction of the induced voltage conforms to the polarity selected. Thus, using the pulse voltage module 16 in FIG. 3, a DC current of both directions can be interrupted, i.e. the DC voltage switch 12 can operate in a bidirectional manner. If the switch operates in a DC network so that voltage sources are disposed on both sides of the switch with changing current direction, then a short circuit can be produced on both sides. Once again, the total current flow in the mechanical switch 13 is overcompensated by the induced voltage and the associated current flow and goes through a zero crossing, thereby causing any arc present to be extinguished.

In the example according to FIG. 3, no short-circuiting switch 163 is provided. There may be no short-circuit of the secondary winding of the transformer 14 which keeps an additional inductance in the form of the primary winding of the transformer 14 in the operating current path, e.g. for current smoothing or to limit current rises.

Another possibility for implementing the pulse current module 16 is shown in FIG. 4. Here the pulse current module 16 includes part of a converter, e.g. a three-phase inverter 165 and the capacitor 161, which at the same time constitutes the associated DC-link capacitor for the converter. The pulse current module 16 is therefore not constructed separately from other components, e.g. of the DC voltage network 10, but overlaps with these components such as a converter. This option reduces the electronic component count.

In the example according to FIG. 4, the secondary winding of the transformer 14 is connected by one of its terminal leads to one of the AC voltage outputs of the converter. The other terminal lead is connected to the midpoint of an additional half bridge 167 having two IGBTs, this additional half bridge 167 being connected in parallel with the capacitor 161 and in parallel with the other half bridges of the inverter 165.

The control device 17 may control the converter, so that in the event of interruption of the DC current, the switches of the converter can be controlled in order to abandon the normal control behavior for the converter, as the capacitor 161 is discharged.

By means of the connection of the transformer 14 to one of the half bridges of the inverter 165 and the additional half bridge 167, the pulse voltage module 16 according to FIG. 4 is also able to connect the capacitor 161 to the transformer 14 in both polarities and therefore bring about bidirectional interruption of the current in the DC voltage network 10.

The invention claimed is:

1. A DC voltage switch comprising:
two terminals linked by an operating current path comprising a mechanical switch; a transformer having a primary side connected in series with the mechanical switch in the operating current path;
a voltage source connected to a secondary side of the transformer;
a switch connected in series with the voltage source; and
a switch for short-circuiting a secondary winding of the transformer.

2. The DC voltage switch as claimed in claim 1, wherein the voltage source comprises a capacitor.

3. The DC voltage switch as claimed in claim 2, further comprising the capacitor connected to a device for charging the capacitor.

4. The DC voltage switch as claimed in claim 1, wherein the mechanical switch has a switching time of less than 5 ms.

5. The DC voltage switch as claimed in claim 1, wherein the voltage source comprises a DC-link capacitor of a converter.

6. The DC voltage switch as claimed in claim 1, wherein the voltage source can be connected to a secondary winding of the transformer in both polarities.

7. The DC voltage switch as claimed in claim 6, further comprising a bridge circuit connected between the secondary side of the transformer and the voltage source.

8. A DC voltage switch comprising:
two terminals linked by an operating current path comprising a mechanical switch; a transformer having a primary side connected in series with the mechanical switch in the operating current path;
a voltage source connected to a secondary side of the transformer; and
a switch connected in series with the voltage source;

wherein the voltage source comprises a DC-link capacitor of a converter.

9. The DC voltage switch as claimed in claim 8, wherein the voltage source comprises a capacitor.

10. The DC voltage switch as claimed in claim 9, further comprising the capacitor connected to a device for charging the capacitor.

11. The DC voltage switch as claimed in claim 8, wherein the mechanical switch has a switching time of less than 5 ms.

12. The DC voltage switch as claimed in claim 8, wherein the voltage source can be connected to a secondary winding of the transformer in both polarities.

13. The DC voltage switch as claimed in claim 12, further comprising a bridge circuit connected between the secondary side of the transformer and the voltage source.

14. A DC voltage switch comprising:
two terminals linked by an operating current path comprising a mechanical switch; a transformer having a primary side connected in series with the mechanical switch in the operating current path;
a voltage source connected to a secondary side of the transformer;
a switch connected in series with the voltage source; and
a bridge circuit connected between the secondary side of the transformer and the voltage source;
wherein the voltage source can be connected to a secondary winding of the transformer in both polarities.

15. The DC voltage switch as claimed in claim 14, wherein the voltage source comprises a capacitor.

16. The DC voltage switch as claimed in claim 15, further comprising the capacitor connected to a device for charging the capacitor.

17. The DC voltage switch as claimed in claim 14, wherein the mechanical switch has a switching time of less than 5 ms.

18. The DC voltage switch as claimed in claim 14, further comprising a switch for short-circuiting a secondary winding of the transformer.

19. The DC voltage switch as claimed in claim 14, wherein the voltage source comprises a DC-link capacitor of a converter.

* * * * *